Sept. 20, 1949.   H. C. ROTERS   2,482,290
IMPULSE MOTOR SYNCHRONIZING SYSTEM
Filed Jan. 6, 1947
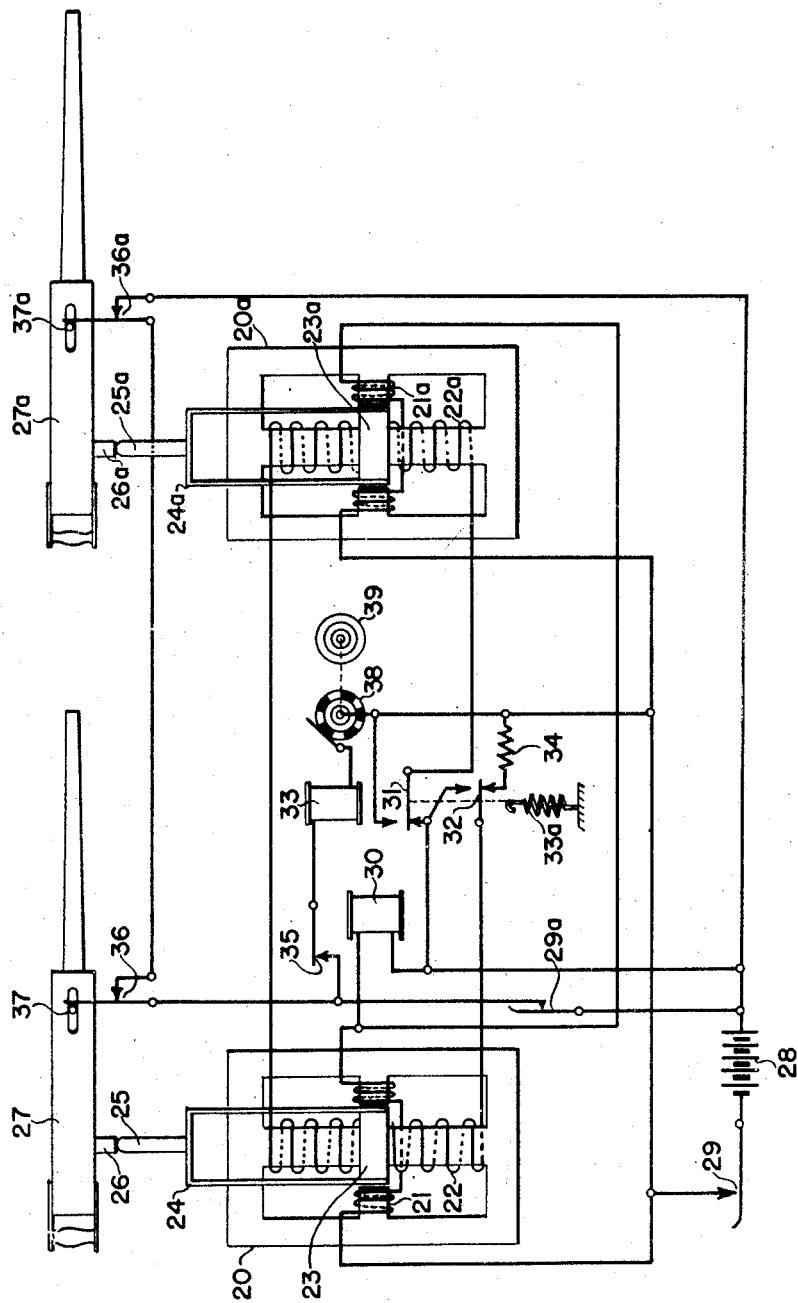
INVENTOR.
HERBERT C. ROTERS
BY Laurence B. Dodds

UNITED STATES PATENT OFFICE 2,482,290

IMPULSE MOTOR SYNCHRONIZING SYSTEM

Herbert C. Roters, Kew Gardens, N. Y., assignor to Fairchild Camera and Instrument Corporation, a corporation of Delaware Application January 6, 1947, Serial No. 720,446

5 Claims. (Cl. 318—37)

This invention relates to impulse motor synchronizing systems and, while it is of general application, it is particularly suitable for controlling the operation of a plurality of impulse motor-operated devices to effect their operation in a predetermined relative time relation as, for example, simultaneously.

This application is a continuation-in-part of applicant's copending application, Serial No. 602,365, filed June 29, 1945, now Patent 2,472,621, issued June 7, 1949, entitled "Impulse motor," and assigned to the same assignee as the present application. While the synchronizing system of the present invention is adapted for operation with impulse motors generally, it is particularly suitable for operation with impulse motors of the type described and claimed in aforesaid copending application.

The present invention is particularly suitable for embodiment in a system for synchronizing a plurality of aircraft turret machine guns and will be illustrated as applied to such an installation. Recently it has become customary to mount aircraft machine guns in groups in revolvable turrets and to aim the guns by the use of compensating gun sights which automatically take into account the ballistics of the projectile and the relative motion between the aircraft and its target. These gun sights have been developed to such a high state of perfection that the accuracy of the gunfire is no longer limited by the precision of the gun sight itself but rather by the stability of the gun mount. The effects of such instability or lack of rigidity in the gun mount are greatly magnified when the individual guns on the mount do not fire simultaneously as then the mount is subjected to severe moment introduced by the recoil of each individual gun. On the other hand, by firing all of such guns simultaneously and by mounting the gun symmetrically with respect to the points of support of the turret, the recoil forces of the guns are simultaneous and their moments on the turret are equal and opposite so that there is no distorting force or moment on the turret.

It is an object of the present invention, therefore, to provide a new and improved impulse motor synchronizing system for synchronizing the operation of a plurality of impulse motor-operated devices in which the operation of the several devices is effected in a predetermined relative time relationship which may be either simultaneous or in a predetermined time sequence.

In accordance with the invention, there is provided an impulse motor synchronizing system adapted to synchronize the operation of a plurality of impulse motor-operated devices and comprising a plurality of impulse motors each adapted to operate one of the devices, each of the motors including an armature winding adapted to be impulse-excited and reciprocable operating means responsive to the excitation of such winding. The system also includes a control circuit for impulse-exciting all of the armature windings in a predetermined relative time relationship, control means for the control circuit, and means responsive to the operation of the devices for actuating the control means.

In a specific form of the invention, the synchronizing system of the type described includes a common circuit for impulse-exciting all of the armature windings simultaneously and a plurality of control means for the common circuit, each of the control means being connected for operation by one of the motor-operated devices, whereby excitation of the armature windings is delayed until all of the devices assume a pre-operating condition.

For a better understanding of the present invention, together with other and further objects thereof, reference is had to the following description taken in connection with the accompanying drawings, and its scope will be pointed out in the appended claims.

Referring now to the drawings, the single figure is a schematic diagram of a system embodying the invention for synchronizing the firing of two machine guns.

Referring now to the drawing, there is represented schematically the embodiment of a plurality of impulse motors in a system for synchronizing the operation of a plurality of motor-operated devices, such as the firing of two machine guns, each of the motors being connected and adapted to operate one of the guns. This system also includes means for magnetically biasing the portion of the magnetic circuit adjacent the air gap to increase the power output of an impulse motor of a given size. In this system, each of the two impulse motors is assumed to be of the type illustrated in Figs. 1a–1c, inclusive, of the aforesaid copending application. The two motors 20 and 20a are represented schematically and are provided with field windings 21 and 21a, armature windings 22 and 22a, reciprocable means such as current-carrying actuating members 23 and 23a responsive to the excitation of their respective armature windings, actuating yokes 24 and 24a and actuating pins 25 and 25a, respectively. The pins 25 and 25a are disposed to engage the sear pins 26 and 26a of two machine guns 27 and 27a, respectively, which are assumed to be mounted on a single gun turret. The field windings 21 and 21a are connected in parallel to be energized from a suitable source, such as a battery 28, through a manually operable control switch 29 and the winding of a time-delay relay 30. There is provided a common control circuit for impulse-exciting the armature windings 22 and 22a in a predetermined relative time relationship, specifically, simultaneously. To this end, the windings 22 and 22a are connected in series to direct-current supply terminals, such as a battery source 28, through the movable contacts 31 and 32 of a two-pole double-throw reversing switch 33 effective to connect the armature windings with either polarity to the terminals of source 28. The relay 33 is biased to its "reversed" position by a spring 33a. A current-limiting resistor 34 is included in series with the armature windings 22 and 22a when connected to the source 28 with reverse polarity. The winding of the reversing switch 33 is energized from the source 28 through a control circuit for the common exciting circuit of the armature windings 22 and 22a. This control circuit includes control means and means responsive to the operation of the guns for actuating the control means. Specifically, this control circuit includes the contacts 35 of the time-delay relay 30 and a plurality of control means, such as the serially connected, normally closed switches 36 and 36a, connected for operation by the firing bolts 37 and 37a of the motor-fired guns 27 and 27a, respectively. The arrangement of the switches 36 and 36a is such that they are closed when their respective guns are in firing positions and opened immediately after the firing of the guns. If desired, a synchronizing interrupter 38 driven by a motor 39 may be included in the circuit of the winding of the reversing relay 33 to determine the rate of firing of the guns 27 and 27a.

In considering the operation of the synchronizing system described, it will be assumed that the guns 27 and 27a are in firing position so that the switches 36 and 36a are closed by the firing bolts 37 and 37a, respectively, and that the motor 39 is not operating but that the interrupter 38 is in a position to complete a circuit therethrough to the reversing relay 33. Under such conditions, if the manual control switch 29 is operated, the field windings 21 and 21a are energized therethrough and the time-delay relay 30 is thereupon energized and, after a time interval sufficient to permit the fields of windings 21 and 21a to build up to their normal values, it closes its contacts 35 to energize the reversing relay 33. Prior to operation of the relay 33, its contact elements 31 and 32 are held in their lower positions by the spring 33a, connecting the armature windings 22 and 22a in series across the source 28 with a given polarity which may arbitrarily be called the reverse polarity. Under these conditions, the flux distribution in the vicinity of the air gap of each of the motors 20 and 20a has a zero value to the left of the air gap where the field and armature fluxes are equal and opposite and a value twice that of either the field or armature flux to the right of the air gap and varies uniformly along the gap between these two limiting values, as explained in detail in the aforesaid copending application.

Upon operation of the time-delay relay 30, the reversing relay 33 is energized to operate its contacts 31 and 32 to their upper positions. The result of this operation of the reversing relay 33 is to connect the armature windings 22 and 22a in series across the source 28 with normal polarity. After a small but finite time, the armature fluxes through the armature cores build up to equal values of opposite polarity so that the total swing of the core flux from the initial value to its final value is twice the value which would result from a simple interruption of the armature current. Thus, the mechanical power output of each motor may be approximately doubled without otherwise modifying the design and capacity of the motor while still working the core structure within the same limits of magnetic saturation.

Thus, upon operation of the reversing relay 33, the motors 20 and 20a operate to develop power mechanical impulses at their operating pins 25 and 25a to fire the machine guns 27 and 27a, respectively. At the end of the firing or working stroke described, the firing bolts 37 and 37a of the guns 27 and 27a, respectively, immediately after firing open their respective switches 36 and 36a, thus dropping out the reversing relay 33, the contacts 31 and 32 of which are quickly returned to their initial positions. The reverse power stroke is developed by the current induced in the current-carrying members 23 and 23a both by the collapse of their respective armature fields and the building up of the reverse polarity armature fields.

The rate of collapse of the armature fields is determined by the reluctance of the magnetic circuit of the armature windings and the effective resistance of the armature circuit as modified by the closed-circuit current-carrying members 23 and 23a. This rate of collapse of the armature-circuit flux can be controlled by selecting an appropriate value for the current-limiting resistor 34 to prevent excessive current rise in the armature windings while permitting the armature field to collapse sufficiently quickly to provide a powerful return stroke and a fast motor operation. Upon return of the reversing switch 33 to its normal position, as described, and the collapse of the armature fields, the resultant flux through the core structure again changes to its initial value and the system as a whole is in its initial operating condition.

After the firing of the guns 27 and 27a, the circuit of the reversing relay 33 cannot be subsequently completed for a second firing operation until both of the firing bolts 37 and 37a have dropped back into their firing positions, thereby closing both of the switches 36 and 36a; thus, the excitation of the armature windings 22 and 22a is delayed until both of the guns 27 and 27a assume their pre-operating condition.

The change in armature current and armature flux upon the operation of the reversing relay results in secondary currents in the current-carrying members 23 and 23a which react with their respective constant fields to produce mechanical impulses on their respective operating rods 25 and 25a. Upon the firing of the guns 27 and 27a and the dropping out of the reversing relay as described, the reversal of current in the members 23 and 23a is effected by the voltages induced in these members both by the collapse of the initial armature flux and by the building up of the armature flux to opposite polarity, as described. This reversed current in the members 23 and 23a is effective to develop a substantial restoring mechanical impulse opposite to the initial mechanical impulse, thus to return the members 23 and 23a and their associated elements quickly to their normal positions. This reversal of armature current further accelerates the return of the armature flux to its initial or positive value after a firing operation and thus permits a faster operation of the impulse motor. In practice, the normal time between shots of a machine gun is of the order of 85 milliseconds or less. It has been found that an impulse motor may be readily designed in accordance with the features described above to operate within a cycle of this order.

In case it is desired to control the firing of the guns 27 and 27a at some periodicity greater than that determined by their natural firing cycle, as described above, a periodic circuit controller such as an interrupter 38 may be included in the circuit of the reversing relay 33 and driven by a motor 39. With this arrangement, the firing cycle will be initiated as described above but after the firing of the guns the completion of the circuit of the reversing relay 33 is delayed during the time that the circuit is opened at the interrupter 38 so that the firing cannot occur more frequently than at intervals determined by the successive closings of the circuit at the interrupter 38.

Further, if desired, there may be provided a manually operable normally open control switch 29a connected in parallel with the gun-operated switches 36 and 36a. With such an arrangement, closing of the switch 29a will produce a current step through the armature windings 22 and 22a, causing the core flux to change in a given sense by an amount equal to one-half that due to a reversal of the armature current, as described above, and producing a forward or working stroke of the reciprocable members 23, 23a to one extreme position. At a desired interval thereafter, the switch 29a may be opened and a reverse current step applied to the armature windings 22 and 22a to produce a return working stroke of the reciprocable members 23, 23a to their other extreme positions. In this way, the working and return strokes may be irregularly spaced as desired to provide what might be termed a double-acting impulse motor. However, in the operation of the motor in this fashion, the armature windings and the magnetic circuit must be relatively so proportioned that the core field will limit the rise in armature current and maintain a rate of change of flux in one sense or the other during the longest interval between successive steps. Otherwise, the current in the armature windings tends to rise to excessive values as the armature flux approaches a constant value, that is, when its rate of change approaches zero, while the motor current in the members 23 and 23a, and thus the motor force, will fall to zero. The term "impulse" is used herein and in the appended claims in its generic sense to include either a complete pulse comprising forward and reverse impulses or a single step or impulse.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An impulse motor synchronizing system adapted to synchronize the operation of a plurality of impulse motor-operated devices comprising, a plurality of impulse motors each adapted to operate one of said devices, each of said motors including an armature winding adapted to be impulse-excited, and reciprocable means responsive to the excitation of said winding, a common circuit for impulse-exciting all of said armature windings simultaneously, and a plurality of control means for said common circuit, each of said control means being connected for operation by one of said motor-operated devices, whereby excitation of said armature windings is delayed until all of said devices assume a pre-operating condition.

2. An impulse motor synchronizing system adapted to synchronize the operation of a plurality of impulse motor-operated devices comprising, a plurality of impulse motors each adapted to operate one of said devices, each of said motors including an armature winding adapted to be impulse-excited, and reciprocable means responsive to the excitation of said winding, a common circuit for impulse-exciting all of said armature windings simultaneously, direct current supply terminals, a reversing switch effective to connect said control circuit to said terminals with either polarity, and a plurality of control means for said reversing switch, each of said control means being connected for operation by one of said motor-operated devices, whereby excitation of said armature windings is delayed until all of said devices assume a pre-operating condition.

3. An impulse motor synchronizing system adapted to synchronize the operation of a plurality of impulse motor-operated devices comprising, a plurality of impulse motors each adapted to operate one of said devices, each of said motors including an armature winding adapted to be impulse-excited, and reciprocable means responsive to the excitation of said winding, a common circuit for impulse-exciting all of said armature windings simultaneously, and a plurality of serially-connected, normally-closed switches for said common circuit, each of said switches being disposed to be opened upon operation of one of said motor-operated devices, whereby excitation of said armature windings is delayed until all of said devices assume a pre-operating condition.

4. An impulse motor synchronizing system adapted to synchronize the operation of a plurality of impulse motor-operated devices comprising, a plurality of impulse motors each adapted to operate one of said devices, each of said motors including an armature winding adapted to be impulse-excited, and reciprocable means responsive to the excitation of said winding, a common circuit for impulse-exciting all of said armature windings simultaneously, direct-current supply terminals, a reversing switch effective to connect said control circuit to said terminals with either polarity, a plurality of control means for said reversing switch, each of said control means being connected for operation by one of said motor-operated devices, whereby excitation of said armature windings is delayed until all of said devices assume a pre-operating condition, and a periodic circuit controller in circuit with said reversing switch and having a periodicity greater than the natural periodicity of said devices.

5. An impulse motor synchronizing system adapted to synchronize the operation of a plurality of impulse motor-operated devices comprising, a plurality of impulse motors each adapted to operate one of said devices, each of said motors including an armature winding adapted to be impulse-excited, and reciprocable means responsive to the excitation of said winding, a common circuit for impulse-exciting all of said armature windings simultaneously, a plurality of serially-connected normally-closed switches for said common circuit, each of said switches being disposed to be opened upon operation of one of said motor-operated devices, whereby excitation of said armature windings is delayed until all of said devices assume a pre-operating condition, and a manually operable switch in parallel with said common circuit, operation of said manually operable switch between open and closed positions being effective to operate said reciprocable means between its extreme positions.

HERBERT C. ROTERS.

REFERENCES CITED

The following references are of record in the file of this patent:

UNITED STATES PATENTS

| Number | Name | Date |
| --- | --- | --- |
| 1,627,727 | Charter | May 10, 1927 |
| 2,075,877 | Walker | Apr. 6, 1937 |
| 2,410,728 | Fuscaldo | Nov. 5, 1946 |